United States Patent
Miyahisa et al.

(10) Patent No.: US 7,695,864 B2
(45) Date of Patent: Apr. 13, 2010

(54) ELECTRODE PLATE FOR BATTERY, ELECTRODE GROUP FOR BATTERY, LITHIUM SECONDARY BATTERY, AND METHOD FOR PRODUCING ELECTRODE PLATE FOR BATTERY

(75) Inventors: Masaharu Miyahisa, Osaka (JP); Yoshiki Ohsawa, Osaka (JP); Hideyuki Kumakiri, Osaka (JP); Tsutomu Nishioka, Osaka (JP); Shusaku Goto, Osaka (JP); Takeshi Kasamatsu, Osaka (JP); Seiichi Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/515,482

(22) PCT Filed: Jul. 22, 2008

(86) PCT No.: PCT/JP2008/001945

§ 371 (c)(1),
(2), (4) Date: May 19, 2009

(87) PCT Pub. No.: WO2009/013890

PCT Pub. Date: Jan. 29, 2009

(65) Prior Publication Data

US 2010/0035140 A1    Feb. 11, 2010

(30) Foreign Application Priority Data

Jul. 20, 2007  (JP) ............................. 2007-189335
Jul. 18, 2008  (JP) ............................. 2008-187431

(51) Int. Cl.
  *H01M 4/02*  (2006.01)
  *H01M 4/04*  (2006.01)

(52) U.S. Cl. ................ 429/209; 429/129; 429/246; 429/251; 429/252

(58) Field of Classification Search .............. None
See application file for complete search history.

(56) References Cited

U.S. PATENT DOCUMENTS

2005/0053833 A1   3/2005  Hayashida et al.
2006/0194116 A1   8/2006  Suzuki et al.
2006/0281007 A1  12/2006  Tsutsumi et al.
2007/0122715 A1   5/2007  Fujino et al.

FOREIGN PATENT DOCUMENTS

| JP | 07-220759 | 8/1995 |
| JP | 09-298057 | 11/1997 |
| JP | 11-154508 | 6/1999 |
| JP | 2001-176558 | 6/2001 |
| JP | 2004-006275 | 1/2004 |
| JP | 2005-285607 | 10/2005 |
| JP | 2006-012788 | 1/2006 |
| JP | 2006-107853 | 4/2006 |
| WO | WO 2005/029614 | 3/2005 |
| WO | WO 2005/067080 A1 | 7/2005 |

OTHER PUBLICATIONS

Notice of Reasons for Rejection, with English translation, issued in Japanese Patent Application No. 2008-187431, mailed Apr. 21, 2009.

*Primary Examiner*—Dah-Wei D Yuan
*Assistant Examiner*—Katherine Turner
(74) *Attorney, Agent, or Firm*—McDermott Will & Emery LLP (57) ABSTRACT

In an electrode plate 3 including a both-surface coated part 14 in which an active material layer 13 and a porous protective film 28 are formed, a core material exposed part 18 which is an end part of the current collector core material 12 and in which the active material layer 13 and the porous protective film 28 are not formed, and a one-surface coated part 17 which is provided between the both-surface coated part 14 and the core material exposed part 18 and in which the active material layer 13 and the porous protective film 28 are formed, a plurality of grooves 10 are formed in both surfaces of the both-surface coated part 14 and are not formed in the one-surface coated part 17. The grooves 10 are formed so that each of the grooves extends from the porous protective film 28 to the active material layer 13.

11 Claims, 6 Drawing Sheets

ELECTRODE PLATE FOR BATTERY, ELECTRODE GROUP FOR BATTERY, LITHIUM SECONDARY BATTERY, AND METHOD FOR PRODUCING ELECTRODE PLATE FOR BATTERY

RELATED APPLICATIONS

This application is the U.S. National Phase under 35 U.S.C. 371 of International Application No. PCT/JP2008/001945, filed on Jul. 22, 2008, which in turn claims the benefit of Japanese Application No. 2007-189335, filed on Jul. 20, 2007 and Japanese Application No. 2008-187431, filed on Jul. 18, 2008, the disclosures of which Applications are incorporated by reference herein.

TECHNICAL FIELD

The present disclosure mainly relates to an electrode plate for a lithium secondary battery, a method for producing the electrode plate, an electrode group including the electrode plate, and a lithium secondary battery using the electrode group.

BACKGROUND ART

In recent years, lithium secondary batteries have been widely used as driving power supplies for mobile electronic devices and communication devices. In such a lithium secondary battery, in general, a carbon material capable of inserting and extracting lithium is used for a negative electrode plate and a composite oxide, such as $LiCoO_2$ or the like, containing transition metal and lithium is used for a positive electrode plate, thereby achieving a secondary battery with a high potential and a high discharge capacity. Now, with the development of electronic devices and communication devices having an increased range of functions, further increase in capacity is desired.

To realize a high capacity lithium secondary battery, for example, a volume of a positive electrode plate and a negative electrode plate occupying in a battery case is increased and an empty space other than a space between the electrode plates in the battery case is reduced. Thus, the capacity of the lithium battery can be further increased.

Moreover, for mixture pastes for positive and negative electrode plates, a mixture paste made of a material of a positive electrode plate or a negative electrode plate is applied onto a current collector core material and dried to form an active material layer and then, a high pressure is applied the active material by roll pressing to compress the active material to a predetermined thickness, thereby increasing a filling density. Thus, a further increase in capacity can be achieved.

When a filling density of an active material in each electrode plate is increased, it becomes difficult to impregnate a nonaqueous electrolyte with a relatively high viscosity, which has been injected into a battery case, into small gaps in an electrode group formed of positive and negative electrode plates stacked or spirally wound with a separator interposed therebetween with a high density. Therefore, it requires a long time to impregnate a predetermined amount of the nonaqueous electrolyte into the electrode group. Furthermore, with an increased filling density of the active material of each electrode plate, a porosity in each electrode plate is reduced and it is more difficult to impregnate the electrolyte thereinto. Therefore, the ability of impregnating the electrode group with the nonaqueous electrolyte is further reduced and, as a result, the distribution of the nonaqueous electrolyte in the electrode group becomes nonuniform.

In Patent Document 1, a method in which electrolyte guiding grooves are formed in a surface of a negative electrode active material layer along a penetrating direction of the nonaqueous electrolyte to achieve proper impregnation of the nonaqueous electrolyte into an entire negative electrode is described. It should be noted that an impregnation time can be reduced by increasing width and depth of the grooves but, by doing so, an amount of the active material is reduced. This causes reduction in charge/discharge capacity and nonuniform reactions between electrode plates, so that a battery property is deteriorated. Therefore, taking this into consideration, the width and depth of the grooves are set to be predetermined values.

The grooves formed in the surface of the negative electrode active material layer might cause fractures of electrode plates when the electrode plates are wound to form an electrode group. Patent Document 2 discloses a method for improving impregnation while preventing fractures of electrode plates. Specifically, grooves are formed in surfaces of electrode plates so that each of the grooves makes an angle with respect to a longitudinal direction of the electrode plate, thereby distributing tensile force applied in the longitudinal direction when the electrode plate is wound to form an electrode group. Thus, fractures of the electrode plates can be prevented.

In Patent Document 3, a method in which a porous film having convex portions partially formed on a surface thereof facing a positive electrode or a negative electrode is provided, not for the purpose of improving impregnation with an electrolyte but for the purpose of suppressing overheat caused by overcharge, is described. That is, a larger amount of a nonaqueous electrolyte is maintained in spaces formed between the convex portions of the porous film and an electrode plate than in other spaces to induce overcharge reaction in the spaces in a concentrated manner. By doing so, overcharge of a battery as a whole can be suppressed and overheat due to overcharge can be suppressed.

In a lithium secondary battery of which a capacity is increased by the above-described means, for example, when a foreign material is mixed in the battery for some reason and causes damage of a separator and thus a short circuit between a positive electrode plate and a negative electrode plate occurs, a current flow concentrates in short circuited part and rapidly generates heat. This might cause decomposition of a positive electrode material and a negative electrode material, the generation of gas due to boiling or decomposition of an electrolyte, and the like.

To cope with problems resulting from the internal short circuit, methods in which a porous protective film is formed to coat a surface of a negative electrode active later or a positive electrode active material layer and thereby the generation of an internal short circuit is suppressed are described in Patent Documents 4 and 5 and the like.

Patent Document 1: Japanese Published Patent Application No. 9-298057

Patent Document 2: Japanese Published Patent Application No. 11-154508

Patent Document 3: Japanese Published Patent Application No. 2006-12788

Patent Document 4: Japanese Published Patent Application No. H7-220759

Patent Document 5: International Publication No. 2005/029614 (pamphlet)

Problems which the Invention is to Solve

In winding a positive electrode plate and a negative electrode plate with a separator interposed therebetween to form an electrode group, the electrodes are wound with exposed parts thereof in which a current collector core material (current collector) with a current collector lead equipped is exposed, as a winding start end. Therefore, an active material layer at an innermost side of a core part of the formed electrode group is a useless part which does not contribute to any battery reaction. Because of this, at an end part of the core material (i.e., winding start part), an active material layer is formed on only one surface of the core material (and at other parts, the active material layer is formed on each of both surfaces of the core material), thereby eliminating the useless part which does not contribute any battery reaction. By doing so, a spatial volume in a battery case can be effectively used and thus a capacity of the battery is increased.

As a method for forming grooves in surfaces of an active material layers formed on both surfaces of an electrode plate, there is a method for forming grooves, in which a pair of rollers having a plurality of line projections formed on their surfaces are arranged on and under the electrode plate and then are rolled/moved while a pressure is applied onto each of both surfaces of the electrode plate by pressing the rollers against each of both surfaces. Using this method (which will be hereafter referred to as a "roll pressing"), a plurality of grooves can be simultaneously formed in each of both surfaces of an electrode plate. Therefore, this method is suitable for use in mass-production.

Assume that grooves are formed in a surface of an active material layer and then a porous protective film is formed over the surface of the active material layer for the purpose of suppressing the generation of an internal short circuit. In this case, if the grooves formed in the surface of the active material layer are filled with the porous protective film, the effect of improving impregnation with an electrolyte can not be fully exhibited.

Even in such a case, however, the porous protective film is usually formed so as to have a very small thickness (which is typically, about ¹⁄₂₀-¹⁄₄₀ of the thickness of the active material layer), compared to the active material layer, and thus, if grooves are formed using roll pressing after forming the porous protective film over the surface of the active material layer, grooves can be formed not only in the surface of the porous protective film but also in the active material layer under the porous protective film. Therefore, the effect of improving impregnation with an electrolyte can be maintained.

The present inventors examined various electrode plates in which grooves were formed in a surface of the porous film formed over both surfaces of the active material layer by roll pressing for the purpose of improving impregnation with an electrolyte and suppressing the generation of an internal short circuit, and found the following problems.

Figure 6:
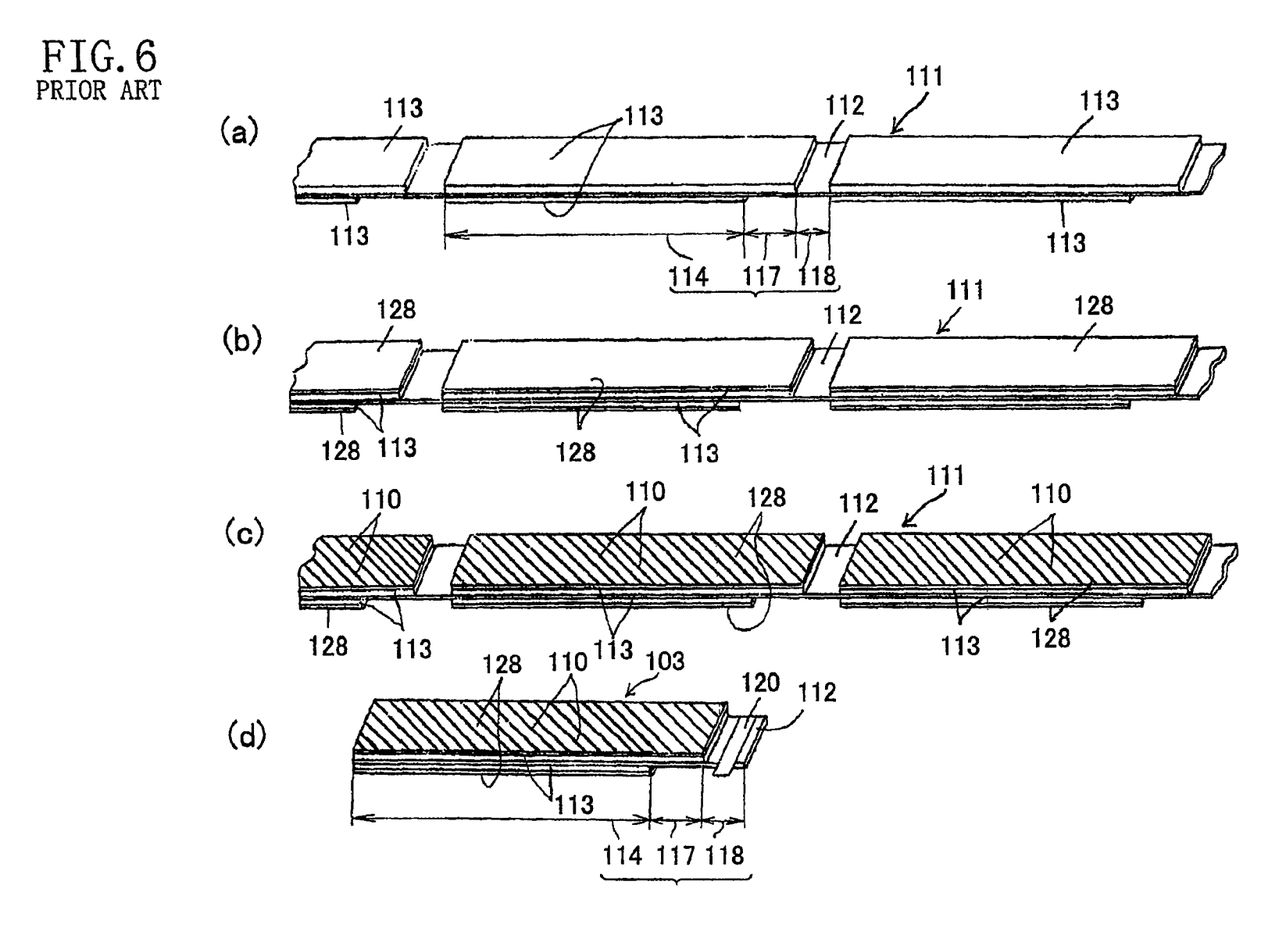
FIGS. 6(a) through 6(d) are perspective views illustrating respective steps for producing a known electrode plate for a battery.

FIGS. 6(a) through 6(d) are perspective views illustrating respective steps for producing an electrode plate 103. First, as shown in FIG. 6(a), an electrode plate hoop material 111 including both-surface coated parts 114 in which an active material layer 113 is formed on each of both surfaces of a belt-like current collector core material 112, one-surface coated parts 117 in which the active material layer 113 is formed on only one of the surfaces of the core material 112, and core material exposed parts 118 in which the active material layer 113 is not formed is provided. Thereafter, as shown in FIG. 6(b), a porous protective film 128 is formed over a surface of the active material layer 113 to coat the active material layer 113.

Next, as shown in FIG. 6(c), a plurality of grooves 110 are formed in the surface of the active material layer 113 as well as the surface of the porous protective film 128 by roll pressing and then, as shown in FIG. 6(d), the electrode plate hoop material 111 is cut at each of boundaries of the both-surface coated parts 114 and the core material exposed parts 118. Thereafter, a current collector lead 120 is spliced to the core material exposed part 118. Thus, the electrode plate 103 is produced.

Figure 7:
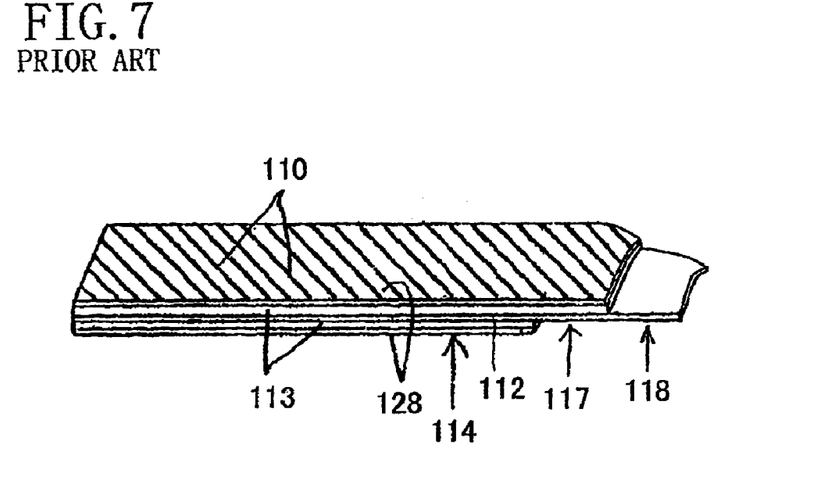
FIG. 7 is a perspective view describing problems of the known electrode plate for a battery.

However, as shown in FIG. 7, when the electrode plate hoop material 111 was cut at the boundaries of the both-surface coated parts 114 and the core material exposed parts 118, there arose a problem in which the core material exposed parts 118 and the one-surface coated parts 117 each being provided continuously from an associated one of the core material exposed parts 118 were largely deformed into a curved shape.

A reason for this was presumed that the grooves 110 were also formed in the surface of the active material layer 113 and the surface of the porous protective film 128 provided in each of the one-surface coated parts 117 continuously after formation of the grooves 110 in surfaces of the active material layers 113 and the porous protective films 128 provided on both surfaces of each of the both-surface coated parts 114, because roll pressing was performed while the electrode plate hoop material 111 was continuously passed through between the rollers.

Specifically, when the active material layers 113 were rolled out by forming the grooves 110 therein (expansion of the active material layer 113 having a large thickness is considered dominant), the active material layers 113 provided both surfaces thereof were rolled out in the same extent in the both-surface coated parts 114 but, in the one-surface coated parts 17, in contrast, the active material layer 113 was rolled out only at one surface of each of the one-surface coated parts 117. Accordingly, because of tensile stress of each active material layer 113, the one-surface coated parts 117 were largely deformed to curve to the side in which the active material layer 113 was not formed.

If an end part (including the core material exposed part 118 and the one-surface coated part 117 provided continuously from the core material exposed part 118) of the electrode plate 103 is deformed into a curved shape by cutting the electrode plate hoop material 111, a winding displacement might occur in winding the electrode plate 103 to form an electrode group. Furthermore, in transferring the electrode plate 103, there might be cases where the end part of the electrode plate 103 is not be securely chucked and, as a result, transferring the electrode plate 103 is failed or fall-off of an active material occurs. This might cause not only reduction in productivity but also reduction in reliability of batteries. Moreover, also in the case where an electrode group is formed by stacking electrode plates, bending and the like might be caused. This also might cause reduction in productivity and reliability of batteries.

In view of the above-described problems, the present invention has been devised and provides an electrode plate for a battery, which exhibits excellent impregnation of an electrolyte and also has high productivity and reliability, and a lithium secondary battery using the electrode plate.

Solution to the Problems

To solve the above-described problems, according to the disclosure of the present invention, in an electrode plate for a battery in which grooves are formed in both surfaces of a both-surface coated part, grooves are not formed in surfaces of a one-surface coated part. Thus, tensile stress due to an active material layer formed in the one-surface coated part is reduced, so that core material exposed part and the one-surface coated part each being provided continuously from the core material exposed part can be prevented from being largely deformed into a curved shape.

An electrode plate for a battery according to the disclosure of the present invention is an electrode plate for a battery, in which an active material layer formed on a surface of a current collector core material is coated by a porous protective film, and is characterized in that the electrode plate includes: a both-surface coated part in which the active material layer and the porous protective film are formed on both surfaces of the current collector core material; a core material exposed part which is an end part of the current collector core material and in which the active material layer and the porous protective film are not formed; and a one-surface coated part which is provided between the both-surface coated part and the core material exposed part and in which the active material layer and the porous protective film are formed on only one of surfaces of the current collector core material, a plurality of grooves are formed in both surfaces of the both-surface coated part and are not formed in the one-surface coated part, and the grooves are formed in a surface of the active material layer as well as a surface of the porous protective film so that each of the grooves extends from the porous protective film to the active material layer.

In the above described configuration, the grooves are formed in the surfaces of the both-surface coated part but not in the surfaces of the one-surface coated part, and thus impregnation of an electrolyte is improved and also deformation of the core material exposed part and the one-surface coated part provided continuously from the core material exposed part in the electrode plate into a curved shape can be prevented. Accordingly, winding displacement caused when electrode plates are wound to form an electrode group or bending caused when electrode plates are stacked to form an electrode group can be prevented, and also troubles in transferring electrode plates or fall-off of an active material can be prevented. As a result, an electrode plate for a battery, which exhibits good impregnation of an electrolyte, good productivity and good reliability and also in which the generation of an internal short circuit is suppressed can be achieved.

Note that the electrode plate is preferably a negative electrode plate. Also, the porous protective film is preferably formed of a material containing inorganic oxide as a major component. For example, the porous protective film is preferably formed of a material containing alumina and/or silica as a main component.

In one embodiment of the present invention, the porous protective film has a smaller thickness than a depth of the grooves. A depth of the grooves is preferably within a range of 4 µm to 20 µm. The grooves are preferably formed with a pitch of 100 µm to 200 µm along a longitudinal direction of the electrode plate. Furthermore, the grooves in the both surfaces of the both-surface coated part are formed so as to be tilted at an angle of 45 degrees from a longitudinal direction of the electrode plate so that a tilting direction of the grooves in one surface is different from a tilting direction of the grooves in the other surface and so as to intersect with one another at right angles in a grade separated crossing manner.

An electrode group for a battery according to the disclosure of the present invention is an electrode group for a battery, in which a positive electrode plate and a negative electrode plate are provided with a separator interposed therebetween, and is characterized in that at least one of the positive electrode plate and the negative electrode plate has the above-described configuration, and the electrode group is wound with the core material exposed part of the electrode plate as a winding start end or is stacked with the core material exposed part of the electrode plate as a stacking start end.

A lithium secondary battery according to the disclosure of the present invention is characterized in that the above-described electrode group is placed in a battery case, a predetermined amount of a nonaqueous electrolyte is injected, and an opening portion of the battery case is closely sealed.

A method for producing an electrode plate for a battery according to the disclosure of the present invention is a method for producing the above-described electrode plate for a battery, and is characterized in that the method includes the steps of: a) preparing an electrode plate hoop material including a both-surface coated part in which an active material layer and a porous protective film are provided on both surfaces of a current collector core material, a one-surface coated part in which the active material layer and the porous protective film are provided on only one of surfaces of the current collector core material and a core material exposed part in which the active material layer and the porous protective film are not provided, the both-surface coated part, the one-surface coated part and the core material exposed part being continuously formed in this order; b) rotating a pair of rollers each of which has a plurality of line projections formed on a surface thereof and which are arranged on and under the electrode plate hoop material with the pair of rollers pressed against both surfaces of the electrode plate hoop material so as to pass the electrode plate hoop material through a space between the pair of rollers, thereby simultaneously forming a plurality of grooves in both surfaces of the both-surface coated part; c) maintaining, after the both-surface coated part is passed through the space between the pair of rollers, the pair of rollers in a no pressure applied state for the one-surface coated part while the one-surface coated part is passed through the space between the pair of rollers; and d) cutting the negative electrode plate hoop material at the core material exposed part provided between the both-surface coated part and the one-surface coated part to divide the electrode plate hoop material into electrode plates for a battery, and in the step b), the grooves are formed in a surface of the active material layer as well as a surface of the porous protective film so that each of the grooves extends from the porous protective film to the active material layer.

Note that the porous protective film preferably has a smaller thickness than a depth of the grooves.

EFFECTS OF THE INVENTION

According to the disclosure of the present invention, in an electrode plate for a battery, in which grooves are formed in surfaces of a both-surface coated part, grooves are not formed in surfaces of a one-surface coated part. Thus, impregnation of an electrolyte is improved and also deformation of the core material exposed part and the one-surface coated part provided continuously from the core material exposed part in the electrode plate into a curved shape can be prevented. Accordingly, winding displacement caused when electrode plates are wound to form an electrode group or bending caused when electrode plates are stacked to form an electrode group can be prevented, and also troubles in transferring electrode plates or fall-off of an active material can be prevented. As a result, an electrode plate for a battery, which exhibits good impregnation of an electrolyte, good productivity and good reliability and also in which the generation of an internal short circuit is suppressed can be achieved.

EXPLANATION OF REFERENCE NUMERALS

1 Electrode group
2 Positive electrode plate
3 Negative electrode plate
4 Separator
7 Battery case
8 Gasket
9 Sealing plate
10 Grooves
11 Negative electrode plate hoop material
12 Current collector core material
13 Negative electrode active material layer
14 Both-surface coated part
17 One-surface coated part
18 Core material exposed part
19 Electrode plate component part
20 Current collector lead
21 Insulation tape
22 Groove processing roller (movable roller)
23 Groove processing roller (fixed roller)
22a, 23a Groove processing line projections
24, 27 Gear
28 Porous protective film

BEST MODE FOR CARRYING OUT THE INVENTION

Hereinafter, embodiments of the present invention will be described with reference to the accompanied drawings. In the drawings, each component having substantially the same function is identified by the same reference numeral for simplification. Note that the present invention is not limited to the following embodiments.

Figure 1:
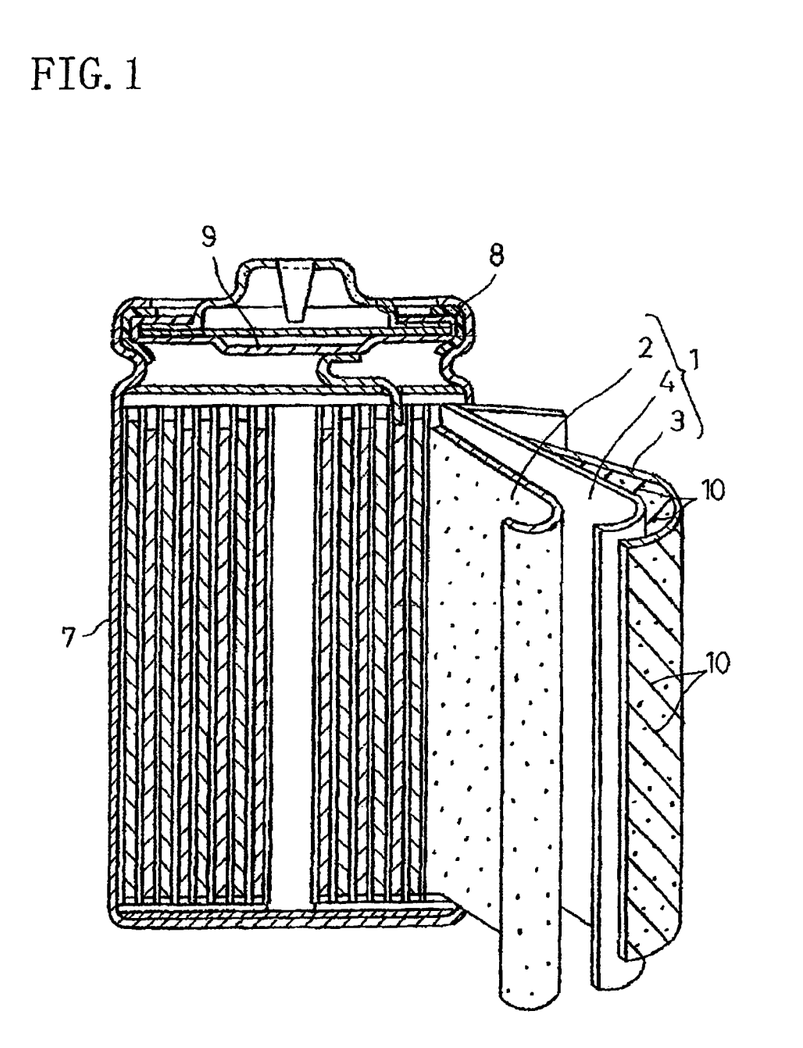
FIG. 1 is a cross-sectional view illustrating a configuration of a lithium secondary battery according to an embodiment of the present invention.

FIG. 1 is a cross-sectional view schematically illustrating a lithium secondary battery according to an embodiment of the present invention. In the lithium secondary battery, a positive electrode plate 2 including composite lithium oxide as an active material and a negative electrode plate 3 including a material capable of containing lithium are spirally wound with a separator 4 interposed therebetween to form an electrode group 1. The electrode group 1 is placed in a cylindrical battery case 7 with a bottom, and a predetermined amount of an electrolyte (not shown) of a nonaqueous solvent is injected into the battery case 7 so as to be impregnated into the electrode group 1. An opening portion of the battery case 7 is bent inwardly in a radial direction and cramped with a sealing plate 9 having a gasket 8 at a circumference edge thereof inserted therein, thereby closely sealing the battery case 7. In the lithium secondary battery, a plurality of grooves 10 are formed on both surfaces of the negative electrode plate 3 so as to intersect with one another at right angles in a grade separated crossing manner. By impregnating an electrolyte through the grooves 10, impregnation of the electrolyte into the electrode group 1 is improved. In addition, the generation of an internal short circuit is suppressed by coating a surface of an active material layer by a porous protective film.

FIGS. 2(a) through 2(d) are perspective views illustrating respective steps for producing the electrode plate 3. FIG. 2(a) illustrates a negative electrode plate hoop material 11 before being divided into negative electrode plates 3. The negative electrode plate hoop material 11 is obtained in the following manner. A negative electrode mixture paste is applied to both surfaces of a current collector core material 12 of a long strip shaped copper foil having a thickness of 10 μm and is dried, and then the current collector core material 12 is compressed by roll pressing so that a total thickness thereof is 200 μm, thereby obtaining a negative electrode active material layer 13. Then, the negative electrode active material layer 13 is subjected to slitter operation so as to have a width of about 60 mm. In this case, as the negative electrode mixture paste, for example, a paste obtained by mixing artificial graphite as an active material, styrene-butadiene copolymer rubber particle dispersant as a binder, and carboxymethyl cellulose as a thickener with an adequate amount of water is used.

FIG. 2(b) is a view illustrating a state of the negative electrode plate hoop material 11 in which a porous protective film 28 is formed by applying a coating agent obtained by adding a small amount of a water-soluble polymer binder material to an inorganic additive and mixing them to the surface of the negative electrode active material layer 13 and then drying the coating agent. Note that the porous protective film 28 is not provided in the core material exposed parts 18 which do not contribute to a battery reaction. Thus, the battery capacity is increased by an amount corresponding to the size of part in which the porous protective film 28 is not formed. Also, in a process step (see FIG. 2(d)), which will be described later, where a current collector lead 20 is attached to each core material exposed part 18 by welding, a process of stripping off the porous protective film 28 from part of the core material exposed part 18 to which the current collector lead 20 is attached can be eliminated. As a result, productivity is improved.

In a battery having the configuration of FIG. 1, the porous protective film 28 exhibits the protective function of suppressing the generation of an internal short circuit and has porosity. Therefore, the porous protective film 28 does not prevent a reaction of each electrode with electrolyte ions in an electrolyte, which is a primary function of a battery. In this case, as the inorganic additive, a silica material and/or an alumina material is preferably used. This is because those materials exhibit good heat resistance, good electrochemical stability within a range of use for a lithium secondary battery, and good resistance to dissolving into an electrolyte, and also is suitable for use as coating materials. Using a silica material and/or an alumina material, the porous protective film 28 providing highly reliable electrical insulation can be obtained. Moreover, as a binder, polyvinylidene fluoride is preferable used.

The thickness of the porous protective film 28 is not particularly limited. However, the thickness of the porous protective film 28 is preferably smaller than the depth of the grooves 10 which will be described later. For example, if the thickness of the grooves 10 (to be formed in both of the porous protective film 28 and the negative electrode active material layer 13) is 4-10 µm, the thickness of the porous protective film 28 is preferably 2-4 µm. Note that if the thickness of the porous protective film 28 is smaller than 2 µm, the protective function of preventing an internal short circuit is insufficient and thus it is not preferable to set the thickness of the porous protective film 28 to be smaller than 2 µm.

Figure 2:
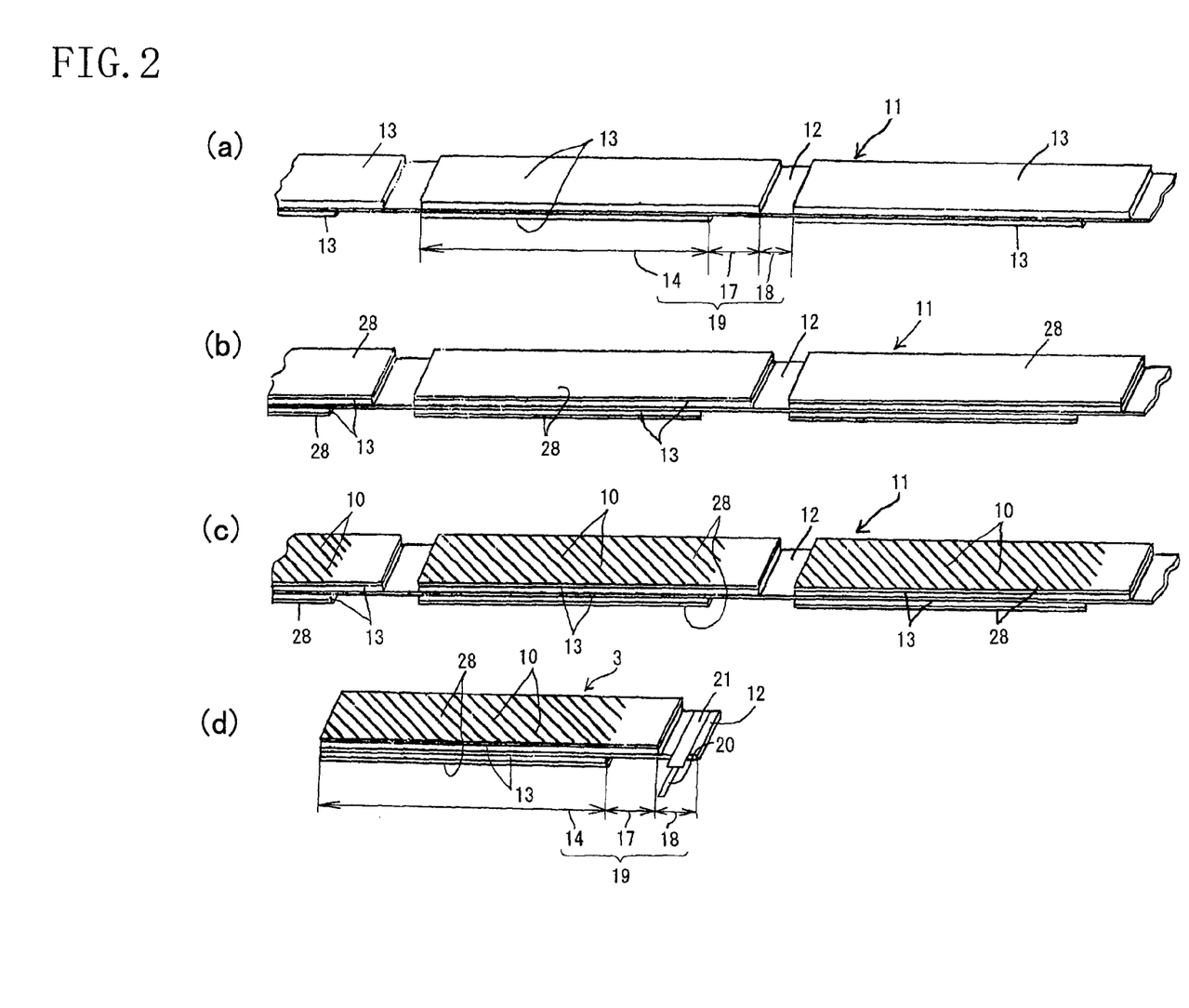
FIGS. 2(a) through 2(d) are perspective views illustrating respective steps for producing an electrode plate for a battery according to an embodiment of the present invention.

The negative electrode plate hoop material 11 in which the above-described grooves 10 are formed in the above-described manner, is cut at the core material exposed parts 18 each being provided between an associated one of the both-surface coated parts 14 and an associated one of the one-surface coated parts by a cutter so as to be divided into electrode plate component parts 19, as shown in FIG. 2(*d*). Thereafter, the current collector lead 20 is attached to the core material 12 of each of the core material exposed parts 18 by welding, and the current collector lead 20 is coated by the insulation tape 21. Thus, the negative electrode plate 3 of the lithium secondary battery is obtained.

Note that the process step of forming, after the negative electrode active material layers 13 are formed on both surfaces of the current collector core material 12 in each of the both-surface coated parts 14, the porous protective film 28 over respective surfaces of the negative electrode active material layers 13 in which the grooves 10 are formed is possibly used. In such a case, however, the grooves 10 formed in the respective surfaces of the negative electrode active material layers 13 are filled with the porous protective film 28 and the substantial thickness of the grooves 10 is reduced. Therefore, the impregnation of an electrolyte can not be sufficiently improved.

In this embodiment, the case where the grooves 10 are formed in the both-surface coated part 14 of the negative electrode plate 3 is described as an example. However, the grooves 10 may be formed in surfaces of porous protective films and positive active material layers provided in the both-surface coated part of the positive electrode plate 2. In general, when the grooves 10 are formed in the negative electrode plate 3 that is less hard than the positive electrode plate 2, the grooves 10 can be formed with application of a smaller pressure and increase in the thickness of the negative electrode active material layer 13 or expansion of the negative electrode active material layer 13 are hardly caused. Therefore, advantageously, large change in specification is not necessary. Moreover, in the case where the grooves 10 are formed in the positive electrode material layers provided in the both-surface coated part of the positive electrode plate 2, even when a large pressure is applied to the relatively hard positive electrode active material layers provided on both surfaces of the both-surface coated part to form grooves, deformation of the electrode plate into a curved shape can be effectively suppressed because grooves are not formed in one-surface coated parts.

By forming the negative electrode plate 3 so as to have the above-described configuration, the following effects can be achieved.

When the negative electrode plate 3 and the positive electrode plate 2 are spirally wound with the separator 4 interposed therebetween to form the electrode group 1, winding starts with the core material exposed part 18 to which the current collector lead 20 is attached as a winding start edge. In this case, a surface of the one-surface coated parts 17 of the negative electrode plate 3 on which the negative electrode active material layer 13 does not exist is placed to be an inner surface in a center part of the electrode group 1 having the above-described wound configuration. The inner surface of the one-surface coated part 17 is a part which does not contribute to battery reaction when those components function as a battery. Thus, when unnecessary formation of the negative electrode active material layer 13 in the part is avoided, a spatial volume in the battery case 7 can be effectively used and a capacity as a battery can be increased accordingly.

Moreover, since the grooves 10 are not formed in the negative electrode active material layer 13 provided in the one-surface coated part 17, large deformation of the core material exposed part 18 and the one-surface coated part 17 formed continuously from the core material exposed part 18 into a curved shape can be prevented. Thus, winding displacement caused in forming the electrode group by winding the positive electrode plate 2 and the negative electrode plate 3 can be prevented in the step shown in FIG. 2(*d*) for cutting the negative electrode plate hoop material 11. Moreover, when the negative electrode plate 3 is wound by a winding device, a trouble such as a failure of chucking of an end part (core material exposed part) of the negative electrode plate 3 and fall-off of the negative active material can be prevented. As a result, an electrode plate for a battery having a good impregnation of an electrolyte and also excellent productivity and reliability can be achieved.

Figure 3:
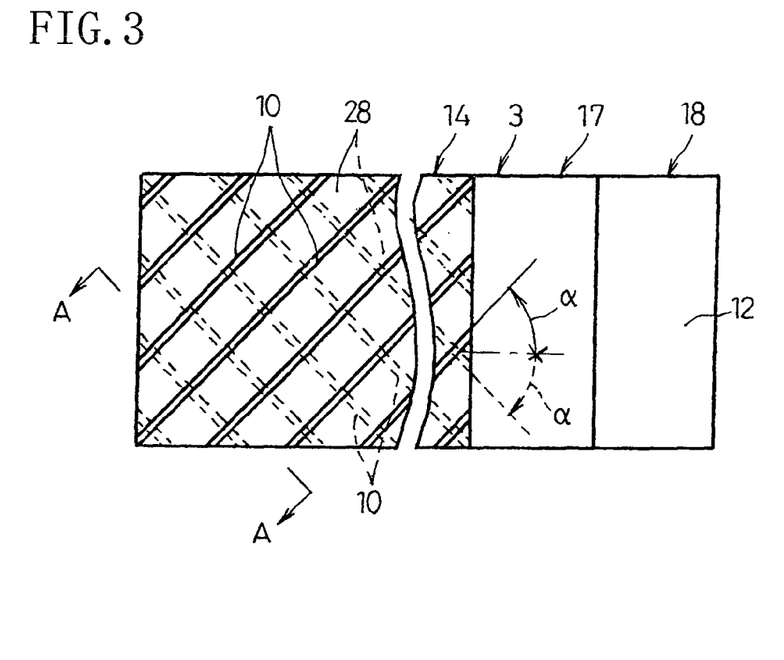
FIG. 3 is a partially enlarged plan view of the electrode plate of an embodiment of the present invention.

FIG. 3 is an enlarged partial plan view of the negative electrode plate 3 of this embodiment. The grooves 10 in the porous protective films 28 and the negative electrode active material layers 13 provided in both surfaces of each of the both-surface coated parts 14 are formed so as to be tilted at an angle α of 45 degrees from a longitudinal direction of the negative electrode plate 3 so that the tilting direction of the grooves 10 in one surface is different from that in the other surface and the grooves 10 intersect with one another at right angles in a grade separated crossing manner. Also, the grooves 10 in the same surface are formed with a constant pitch so as to be arranged in parallel with one another, and each of the grooves 10 extends from one end to another end in the porous protective film 28 and the negative electrode active material layer 13 in the widthwise direction (i.e., a perpendicular direction to the longitudinal direction). Effects of this arrangement of the grooves 10 in the negative electrode plate 3 will be described later.

Figure 4:
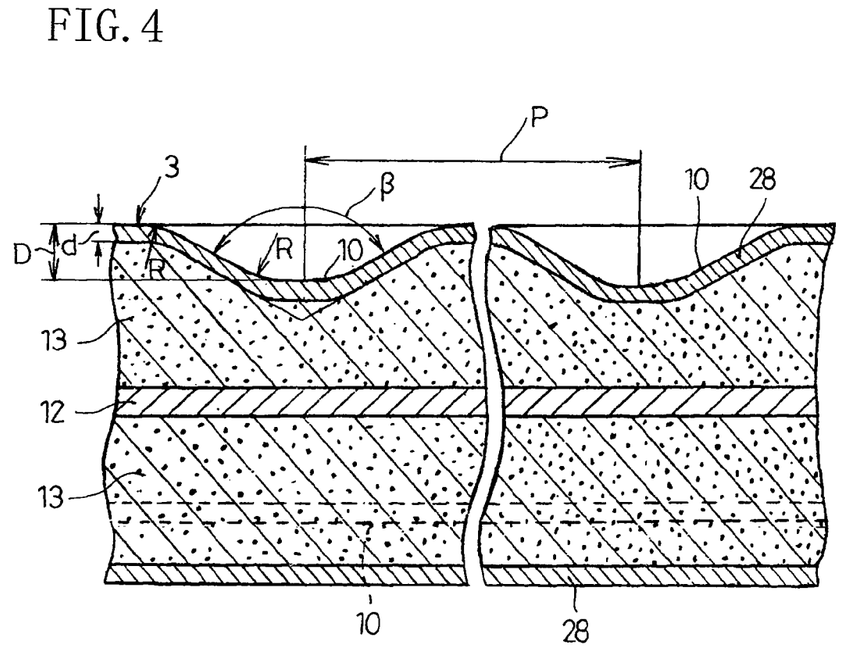
FIG. 4 is an enlarged cross-sectional view taken along the line A-A of FIG. 3.

FIG. 4 is an enlarged cross-sectional view taken along the line A-A of FIG. 3 and illustrates cross sectional shape and arrangement pattern of the grooves 10. The grooves 10 are formed with a pitch P of 170 µm in both surfaces of the both-surface coated part 14. Moreover, the grooves 10 are formed so that a cross section of each groove 10 has an inverted trapezoid shape. A depth D of each groove 10 of this embodiment is 8 µm, each of both side walls of each groove 10 is tilted at an angle β of 120 degrees, and a groove bottom corner part which is a boundary between a bottom surface and each of the walls of each groove 10 has an arc shape with a curvature of 30 µm. By forming each of the grooves 10 into the above-described shape, fall-off of materials of the porous protective film 28 and the negative electrode active material layer 13 from the grooves 10 can be suppressed.

In this embodiment, the case where the pitch P of the grooves 10 is 170 µm and the depth D of the grooves 10 is 8 µm is described as an example. However, the pitch P may be set within a range of 100 µm or more and 200 µm or less. Also, the depth D of the grooves 10 may be set to be within a range of 4 µm or more and 20 µm or less. The depth D is more preferably set to be within a range of 5-15 µm, and even more preferably within a range of 6-10 μm. A reason for this setting will be later described in detail.

Next, a method for forming the grooves 10 in surfaces of the both-surface coated parts 14 will be described with reference to FIG. 5.

Figure 5:
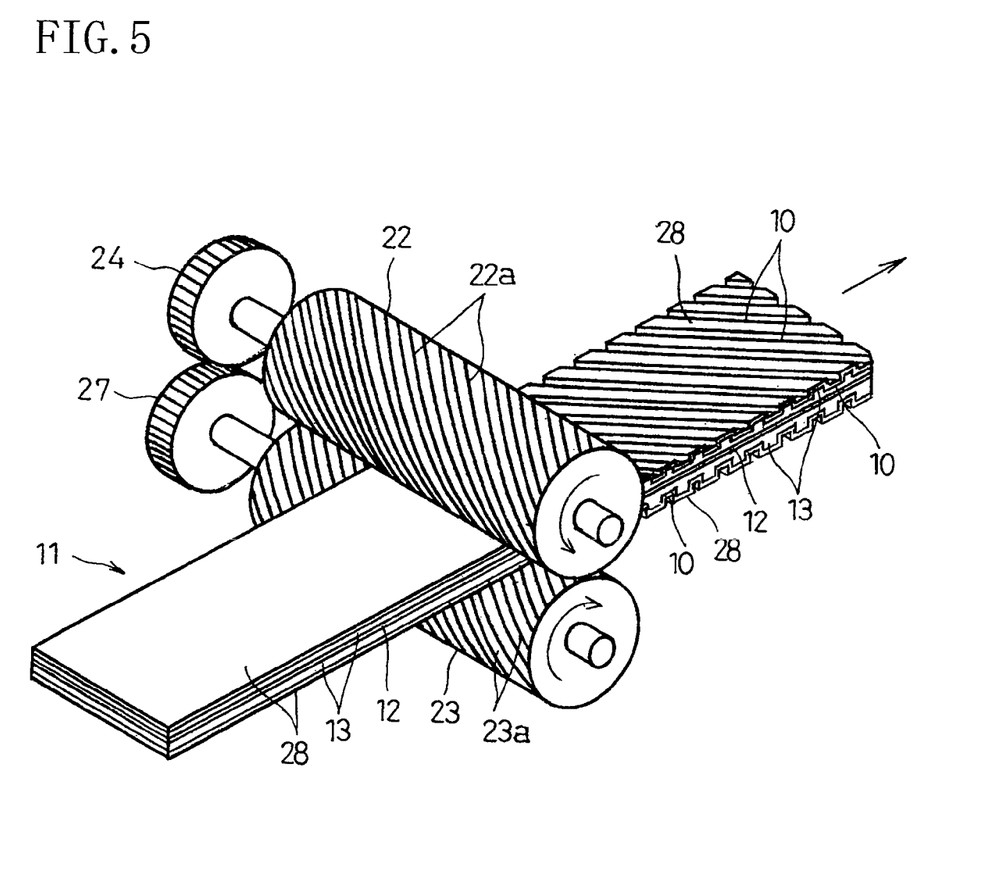
FIG. 5 is a perspective view illustrating a method for forming grooves in a both-surface coated part according the first embodiment of the present invention.

As shown in FIG. 5, a pair of groove processing rollers 22 and 23 are arranged with a predetermined space therebetween, and the negative electrode plate hoop material 11 shown in FIG. 2(*a*) is passed through between the groove processing rollers 22 and 23, so that grooves 10 each having a predetermined shape can be formed in the porous protective films 28 and the negative electrode active material layers 13 provided in both surfaces of each of the both-surface coated parts 14 in the negative electrode plate hoop material 11.

The groove processing rollers 22 and 23 are identical to each other and include a plurality of groove processing line projections 22*a* and 23*a* formed so that each of them makes an angle of 45 degrees with respect to an axis direction. The groove processing line projections 22*a* and 23*a* can be formed easily with high accuracy by thermal spraying of chrome oxide onto an entire surface of an iron roller body to coat the iron roller body, thereby forming a ceramic layer, and then irradiating the ceramic layer with a laser to partially melt the ceramic layer so that a predetermined pattern is made. The groove processing rollers 22 and 23 are substantially the same as a so-called ceramic laser engraved roll which is generally used for printing. As described above, the groove processing rollers 22 and 23 are formed of chrome oxide, so that each roller has a pretty large hardness, i.e., a hardness of HV1150 or more. Therefore, each of the groove processing rollers 22 and 23 has high resistance to sliding and wearing and a lifetime several ten times that of an iron roller can be ensured.

As has been described, the negative electrode plate hoop material 11 is passed through a space between the groove processing rollers 22 and 23 in which the plurality of groove processing line projections 22*a* and 23*a* are formed. Thus, as shown in FIG. 3, the grooves 10 can be formed in the porous protective films 28 and the negative electrode active material layers 13 provided in both surfaces of each of the both-surface coated parts 14 in the negative electrode plate hoop material 11 so that the grooves 10 intersect with one another at right angles in a grade separated crossing manner.

Note that the groove processing line projections 22*a* and 23*a* each have a cross-sectional shape which can form the grooves 10 with the cross-sectional shape shown in FIG. 4. Specifically, the cross-sectional shape has a circular arc end section having an angle β of 120 degrees and a curvature R of 30 μm. A reason why the angle β of the end section is set to be 120 degrees is that if it is set to be a small angle, i.e., an smaller angle than 120 degrees, the ceramic layer becomes easy to be damaged. Also, the curvature R of the end section is set to be 30 μm is for the purpose of preventing the occurrence of cracks in the porous protective film 28 and the negative electrode active material layer 13 when the line projections 22*a* and 23*a* are pressed against the porous protective film 28 and the negative electrode active material layer 13 for forming the grooves 10. The height of the line projections 22*a* and 23*a* is set to be about 20-30 μm because the most preferable range of the depth D of the grooves 10 is 6-10 μm. If the height of the line projections 22*a* and 23*a* is too low, a negative electrode material, stripped from the porous protective film 28 and the negative electrode active material layer 13 when circumferential surfaces of the line projections 22*a* and 23*a* are brought in contact with the porous protective film 28, is attached to the circumferential surfaces of the groove processing rollers 22 and 23. It is therefore required to set the height of the line projections 22*a* and 23*a* to be larger than the depth D of the grooves 10 to be formed.

Rotation of each of the groove processing rollers 22 and 23 will be described. Rotating force generated by a servomotor or the like is transmitted to one of the groove processing rollers 22 and 23, i.e., the groove processing roller 23, rotation force of the groove processing roller 23 is transmitted to the other roller, i.e., the groove processing roller 22 via a pair of gears 24 and 27 pivotally connected to roller axes of the groove processing rollers 22 and 23, respectively, and meshed with each other, and thereby the groove processing rollers 22 and 23 are rotated at the same rotation speed.

As a method of forming the grooves 10 by embedding the groove processing line projections 22*a* and 23*a* of the groove processing rollers 22 and 23 in the porous protective film 28 and the negative electrode active material layer 13, there are a constant dimension method in which the depth D of the grooves 10 is set to be formed according to a gap between the groove processing rollers 22 and 23, and a constant pressure method in which using the correlation between a pressure applied to the line projections 22*a* and 23*a* and the depth D of the grooves 10, the groove processing roller (which will be hereinafter referred to as a "fixed roller") 23 to which rotation force is transmitted is fixed and a pressure to be applied to the groove processing roller (which will be hereinafter referred to as a "movable roller") 22 provided so as to be capable of moving up and down is adjusted to determine the depth D of the grooves 10 to be formed. The constant pressure method is preferably used for forming grooves according to this embodiment.

A reason why the constant pressure method is preferable is as follows. If the constant dimension method is used, it is difficult to precisely set a gap between the groove processing rollers 22 and 23 in micrometer scale. In addition, the axis deflection of each of the groove processing rollers 22 and 23 directly affects the depth D of the grooves 10. In contrast, if the constant pressure method is used, those problems can be easily coped with, even though there is slight influence by a filling density of an active material in the negative electrode active material layer 13, by automatically performing variable adjustment to variations of thickness of the both-surface coated part 14 so that a pressure to be applied to press the movable roller 22 (e.g., an air pressure of an air cylinder) is kept constant. Thus, the grooves 10 each having a predetermined depth D can be formed with high reproducibility.

However, when the grooves 10 are formed using the constant pressure method, the negative electrode plate hoop material 11 has to be passed through the space between the groove processing rollers 22 and 23 without forming the grooves 10 in the porous protective film 28 and the negative electrode active material layer 13 provided in the one-surface coated part 17 of the negative electrode plate hoop material 11. To achieve this, stoppers can be provided between the groove processing rollers 22 and 23 to keep the movable roller 22 in a no pressure applied state for the one-surface coated part 17. Herein, the "no pressure applied state" is a state (including a no contact state as well) in which the movable roller 22 is in contact with the one-surface coated part so that grooves are not formed in the one-surface coated part.

When the negative electrode plate 3 has a small thickness and the thickness of the both-surface coated part 14 is only about 200 μm, process accuracy for forming grooves has to be increased in forming the grooves 10 having a depth D of 8 μm in the both-surface coated part 14 having such a small thickness. To achieve high process accuracy, bearing parts of the groove processing rollers 22 and 23 are preferably formed so that only a necessary gap for a bearing to rotate is provided in each of the bearing parts of the groove processing rollers 22 and 23, each roller axis and associated ones of bearings are arranged to fit with each other without a gap therebetween, and each bearing and a bearing holder for holding the bearing are arranged to fit with each other without a gap therebetween. Thus, the negative electrode plate hoop material 11 can be smoothly passed through the gap between the groove processing rollers 22 and 23 without bumping. Therefore, the negative electrode plate hoop material 11 can be smoothly passed through the space therebetween, without forming the grooves 10 in the one-surface coated part 17.

Next, the depth D of the grooves 10 will be described. An electrolyte injection property (impregnation) for injecting an electrolyte into the electrode group 1 is improved as the depth D of the grooves 10 is increased. To examine this, three types of negative electrode plates 3 in which the grooves 10 were formed with a pitch P of 170 μm in the porous protective films 28 and the negative electrode active material layers 13 in the both-surface coated part 14 were formed. The respective depths D of the grooves 10 in the three types of negative electrode plates 3 were 3 μm, 8 μm and 25 μm. Each of the negative electrode plates 3 and the positive electrode plate 2 were wound with the separator 4 interposed between the positive electrode plate 2 and the negative electrode plate 3, so that three types of electrode groups 1 were formed. The electrode groups 1 were placed respectively in battery cases, and comparison in electrolyte injection time which it takes for an electrolyte to penetrate in each electrode group 1 was made between the electrode groups 1. As a result, the electrolyte injection time was about 45 minutes for the negative electrode plate 3 in which the depth D of the grooves 10 was 3 μm, the electrolyte injection time was about 23 minutes for the negative electrode plate 3 in which the depth D of the grooves 10 was 8 μm, and the electrolyte injection time was about 15 minutes for the negative electrode plate 3 in which the depth D of the grooves 10 was 25 μm. It was clearly shown that as the depth D of the grooves 10 was increased, the electrolyte injection property into the electrode group 1 was improved and, when the depth D of the grooves 10 was reduced to a depth smaller than 4 μm, the effect of improving the electrolyte injection property was hardly achieved.

When the depth D of the grooves 10 is increased, the electrolyte injection property is improved. However, an active material of the negative electrode plates 3 is abnormally compressed in parts thereof in which the grooves 10 are formed, so that lithium ions can not freely move. Accordingly, lithium ion receiving property is deteriorated, so that lithium metal might be easily deposited. Moreover, when the depth D of the grooves 10 is large, the thickness of the negative electrode plate 3 is also increased accordingly and also further expansion of the negative electrode plate 3 is caused, and thus the porous protective film 28 and the negative electrode active material layer 13 are easily peeled off from the current collector core material 12. Furthermore, when the thickness of the negative electrode plate 3 is increased, troubles in production are caused. For example, the porous protective film 28 and the negative electrode active material layer 13 are peeled off from a core material 12 in the winding step in which the electrode group 1 is formed, the electrode group 1 with an increased diameter according to the increase in thickness of the negative electrode plate 3 rubs against end part of an opening portion of the battery case 7 and is difficult to be inserted, or like problems occur. In addition, in a state where the porous protective film 28 and the negative electrode active material layer 13 are easily peeled off from the core material 12, the conductivity is reduced and battery properties are reduced.

It is considered that the peel resistant strength for peeling of the porous protective film 28 and the negative electrode active material layer 13 from the core material 12 is reduced as the depth D of the grooves 10 is increased. That is, as the depth D of the grooves 10 is increased, the thickness of the negative electrode active material layer 13 is increased, i.e., the thickness of the negative electrode active material layer 13 is increased, large force is applied in a direction, which causes the active material to be peeled off from the core material 12. Thus, the peel resistant strength is reduced.

To examine this, four types of negative electrode plates 3 in which the grooves 10 were formed at a pitch P of 170 μm were prepared. The depths D of the grooves 10 in the four types of negative electrode plates 3 were 25 μm, 12 μm, 8 μm and 3 μm. A peel resistant strength test was performed to the negative electrode plates 3. The results of the test showed that the peel resistant strengths of the negative electrode plates 3 in decreasing order of the depth D were about 4 (N/m), about 5 (N/m), about 6 (N/m) and about 7 (N/m). It was thus confirmed from the results that as the depth D of the grooves 10 is increased, the peel resistant strength is reduced.

Based on what has been described above, the following is confirmed regarding the depth D of the grooves 10. That is, when the depth D of the grooves 10 is set to be smaller than 4 μm, the electrolyte injection property (impregnation) is insufficient and, on the other hand, when the depth D of the grooves 10 is set to be larger than 20 μm, the peel resistant strength for peel-off of the active material from the core material 12 is reduced. Thus, reduction in battery capacity might be caused and also the active material which has been fallen off might go through the separator 4 to be in contact with the positive electrode plate 2, thereby causing an internal short circuit. Therefore, by forming the grooves 10 so that the depth D thereof is as small as possible and the number of the grooves 10 is increased, the above-described problems can be prevented and a good electrolyte injection property can be achieved. To obtain this configuration, it is necessary to set the depth D of the grooves 10 to be within a range of 4 μm or more and 20 μm or less, and it is preferable to set it to be within a range of 5-15 μm and more preferable to set to be within a range of 6-10 μm.

Next, the pitch P of the grooves 10 will be described. When the pitch P of the grooves 10 is smaller, the number of the grooves 10 is increased and a total cross-section area of the grooves 10 is increased, so that the electrolyte injection property can be improved. To examine this, three types of the negative electrode plates 3 in which the grooves 10 having a depth D of 8 μm were formed with different pitches were prepared. The pitches P in the three different types of negative electrode plates 3 were 80 μm, 170 μm and 260 μm. Three types of electrode groups 1 respectively including the three types of negative electrode plates 3 were placed in battery cases 7, respectively, and comparison in the electrolyte injection time was made between the electrode groups 1. As a result, the electrolyte injection time was about 20 minutes when the pitch P was 8 μm, the electrolyte injection time was about 23 minutes when the pitch P was 170 μm, and the electrolyte injection time was about 30 minutes when the pitch P was 260 μm. It was clearly shown that as the pitch P of the grooves 10 is reduced, the electrolyte injection property into the electrode group is improved.

When the pitch P of the grooves 10 is set to be smaller than 100 μm, the electrolyte injection property is improved. However, parts of the negative electrode active material layer 13 which are compressed by a large number of the grooves 10 are increased and the filling density of the active material is increased too much. Also, flat part of the surface of the negative electrode active material layer 13 in which the grooves 10 do not exist is reduced too much, so that part between adjacent ones of the grooves 10 has a line projection shape that can be easily crushed. If this line projection shape is crushed when the negative electrode plate 3 is chucked in a transferring process, there arises a problem in which the thickness of the negative electrode active material layer 13 varies.

On the other hand, when the pitch P of the grooves 10 is set to be larger than 200 μm, expansion of the core material 12 occurs and a large stress is applied to the negative electrode active material layer 13. Also, the peel resistant strength for peel-off of the active material from the core material 12 is reduced so that fall-off of the active material is easily caused.

Hereafter, reduction in peel resistant strength caused when the pitch P of the grooves 10 is increased will be described.

When the negative electrode plate hoop material 11 is passed through between the identical groove processing rollers 22 and 23 and the line projections 22a and 23a of the groove processing rollers 22 and 23 are embedded into the porous protective film 28 and the negative electrode active material layer 13 in the both-surface coated parts 14 and the grooves 10 are formed simultaneously in both surfaces of the both-surface coated parts 14, loads of the line projections 22a and 23a are simultaneously applied to the same location and thus are cancelled off only in parts where the line projections 22a and 23a intersect with one another at right angles in a grade separated crossing manner, in other words, where the grooves 10 formed in both surfaces of each of the both-surface coated parts 14 intersect with one anther at right angles in a grade separated crossing manner. In other parts, only the core material 12 receives loads applied by the line projections 22a and 23a. Therefore, in the case where the grooves 10 in the both-surface coated parts 14 are formed to intersect with one another at right angles, when the pitch P of the grooves 10 is large, a span at which the core material 12 receives loads applied by the line projections 22a and 23a is increased and thus a burden on the core material 12 is increased. Accordingly, the core material 12 is expanded and, as a result, the active material is peeled off in the negative electrode active material layers 13 or the active material is peeled off from the core material 12. That is, the peel resistant strength of the negative electrode active material layers 13 with respect to the core material 12 is reduced.

To confirm that as the pitch P of the grooves 10 is increased, the peel resistant strength is reduced, four types of the negative electrode plates 3 in which the grooves 10 having a depth D of 8 μm were formed with different pitches were prepared. The pitches P in the four different types of negative electrode plates 3 were 460 μm, 260 μm, 170 μm and 80 μm, and a peel resistant test was performed to the negative electrode plates 3. As a results, the peel resistance strengths for the four types of negative electrode plates 3 in decreasing order of their pitch P were about 4 (N/m), about 4.5 (N/m), about 5 (N/m) and about 6 (N/m). It was confirmed that as the pitch P of the grooves 10 was increased, the peel resistant strength was reduced and the active material was easily fallen off.

Furthermore, after forming the grooves 10, cross-sections of the negative electrode plates 3 were observed. Then, it was found that in the negative electrode plate 3 in which the grooves 10 were formed with a long pitch P, i.e., 260 μmm, the core material 12 was bent and part of the active material was slightly peeled off from the core material 12.

Based on what has been described above, the pitch P of the grooves 10 is preferably set to be within a range of 100 μm or more and 200 μm or less.

Since the grooves 10 are formed so as to intersect with one another at right angles in a grade separated crossing manner in the both-surface coated part 14, distortions generated in the porous protective films 28 and the negative electrode active material layers 13 in one surface and the other surface when the line projections 22a and 23a are embedded into the porous protective films 28 and the negative electrode active material layers 13 are advantageously cancelled out with one another. Furthermore, when the grooves 10 are formed with a constant pitch P, a distance between parts of the grooves 10 at adjacent intersections is the smallest. Accordingly, only a small burden is put on the core material 12 and the peel resistant strength for peel-off of the active material from the core material 12 is increased, so that fall-off of the active material can be effectively prevented.

Moreover, the grooves 10 are formed in the both-surface coated part 14 so as to form a pattern in which phases thereof in both surfaces are symmetric. Therefore, expansion of each of the negative electrode active material layers 13 caused by forming the grooves 10 occurs in the negative electrode active material layers 13 in both surfaces of the both-surface coated part 14 in an equal manner, and thus distortions do not exist after the grooves 10 are formed.

Furthermore, since the grooves 10 are formed in both surfaces of the both-surface coated part 14, a large amount of electrolyte can be evenly maintained, compared to the case where the grooves 10 are formed only in one surface, so that a long cycle life can be ensured.

To examine this, an observation was conducted in the following manner. A negative electrode plate 3 in which the grooves 10 having a depth D of 8 μm were formed with a pitch P of 170 μm in both surfaces of the both-surface coated part 14, a negative electrode plate 3 in which the grooves 10 having a depth D of 8 μm were formed with a pitch of 170 μm in one surface of the both-surface coated part 14, a negative electrode plate 3 in which the grooves 10 were not formed in both surfaces were prepared. Then, several batteries were formed for each of the battery configurations which respectively include three types of electrode groups 1 formed by using the three types of negative electrode plates 3 and then placing them in battery cases 7, respectively. A predetermined amount of an electrolyte was injected into each of the batteries and impregnated thereinto under vacuum. Thereafter, each of the batteries was decomposed and an impregnation state of the negative electrode plate 3 with the electrolyte was observed.

As a result, immediately after the electrolyte was injected, the area of the negative electrode plate 3 in which the electrolyte was impregnated was only 60% of the total area in the negative electrode plate 3 in which the grooves 10 were not formed in the both surfaces. In the negative electrode plate 3 in which the grooves 10 were formed only at one of the both surfaces, the electrolyte injected area was 100% of the total area in the surface in which the grooves 10 were formed and was about 80% of the total area in the surface in which the grooves 10 were note formed. In contrast, in the negative electrode plate 3 in which the grooves 10 were formed in the both surfaces, the electrolyte injected area in which the electrolyte was impregnated was 100% of the total area in the both surfaces.

Next, after the injection of the electrolyte was completed, to examine how much time is required for the impregnation of the electrolyte into the entire negative electrode plate 3, one battery was decomposed every hour and observed. As a results, in the negative electrode plate 3 in which the grooves 10 were formed in the both surfaces, the electrolyte was impregnated at 100% in the both surfaces immediately after injection of the electrolyte and, in contrast, in the negative electrode plate 3 in which the grooves 10 were formed in only one surface, the electrolyte was impregnated at 100% after a lapse of 2 hours in the surface in which the grooves 10 were not formed. In the negative electrode plate 3 in which the grooves 10 were not formed, the electrolyte was impregnated at 100% at a lapse of 5 hours at the both surfaces. In this negative electrode plate 3, the amount of impregnation of the electrolyte was small in parts which were impregnated with the electrolyte immediately after injection of the electrolyte, and the distribution of the electrolyte was nonuniform. Thus, from the results, it is confirmed that when the depths D of the grooves 10 are all the same, in the negative electrode plate 3 in which the grooves 10 are formed in the both surfaces, time which it takes to complete impregnation of the electrolyte can be reduced to about ½ of that in the negative electrode plate 3 in which the grooves 10 are formed only at one surface, and also a cycle life as a battery can be increased.

Furthermore, batteries under cycle tests were decomposed to examine a distribution of the electrolyte in the electrode plate in which the grooves 10 were formed in only one surface, and thereby the cycle life of the batteries was examined, based on how much EC (ethylene carbonate) which was a major component of a nonaqueous electrolyte was extracted per unit area of the electrode plate. As a result, in each of the batteries, regardless of sampling parts, EC existing in the surface in which the grooves 10 were formed was larger than that in the surface in which the grooves 10 were not formed by about 0.1-0.15 mg. That is, when the grooves 10 are formed in the both surfaces, the amount of EC existing in the surfaces of an electrode plate is the largest, and also the electrolyte is not unevenly distributed but uniformly impregnated. However, in the surface in which the grooves 10 are not formed, the amount of electrolyte is reduced to increase an internal resistance, so that a cycle life thereof is reduced.

By forming the grooves 10 so that each of the grooves 10 extends from one end to the other end of each of the porous protective film 28 and the negative electrode active material layer 13 in the widthwise direction thereof, the electrolyte injection property of injecting an electrolyte into the electrode group 1 is dramatically improved. Thus, the electrolyte injection time can be largely reduced. In addition, since the impregnation of the electrolyte into the electrode group 1 is drastically improved, the occurrence of dry-up of electrolyte can be effectively suppressed at a time of charge/discharge when the components together function as a battery, and also a nonuniform distribution of the electrolyte in the electrode group 1 can be avoided. Moreover, with the grooves 10 formed so that each of the grooves 10 makes an angle with a longitudinal direction of the negative electrode plate 3, the impregnation of the electrolyte into the electrode group 1 is increased and also the generation of a stress in the winding process for forming the electrode group 1 can be suppressed. Thus, cutting of the negative electrode plate 3 in the negative electrode plate 3 can be effectively prevented.

Note that in the above-described embodiment, the case where the grooves 10 are formed in the negative electrode plate 3, which is one of the electrode plates, has been described. To achieve high efficient production by improving the electrolyte injection property of injecting the electrolyte into the electrode group 1, or impregnation, using the grooves 10, the grooves 10 can be formed in either one of the positive electrode plate 2 and the negative electrode plate 3. The electrolyte injection property or impregnation can be improved by forming the grooves 10 in either electrode plate. In such case, as long as the grooves 10 having the same depth D are formed with the same pitch P, the electrolyte injection property, or impregnation can be improved in the same manner by forming the grooves 10 in either electrode plate. When grooves are formed in a positive electrode plate 2 of a lithium secondary battery, the positive electrode plate 2 has an active material layer which is harder than that of a negative electrode plate 3 and thus a large pressure has to be applied in forming grooves. In contrast, when the grooves 10 are formed in the negative electrode plate 3 of the above-described embodiment, the grooves 10 can be formed by applying a small pressure.

The present invention has been described using a preferred embodiment of the present invention. However, the present invention is not limited to the embodiment and, as a matter of course, various modifications are possible. For example, in this embodiment, as the electrode group 1, a configuration including the positive electrode plate 2 and the negative electrode plate 3 spirally wound with a separator interposed therebetween is used. However, even when the electrode group 1 has a configuration in which the positive electrode plate 2 and the negative electrode plate 3 are stacked with a separator interposed therebetween, the same effects can be achieved.

Examples

Hereinafter, a configuration and effects of the present invention will be further described with reference to examples. The present invention is not limited by the examples.

(Formation of Negative Electrode Plate Hoop Material)

One hundred parts by weight (40 wt % of solid content) of artificial graphite as a negative electrode active material, 2.5 parts by weight (1 part by weight in terms of solid content) of styrene butadiene copolymer rubber particle dispersing element relative to 100 parts by weight of an active material, as a binder, 1 part by weight of carboxymethylcellulose relative to 100 parts by weight of the active material, as a thickener, were stirred with an adequate amount of water by a blender, thereby forming a negative electrode mixture paste. The negative electrode mixture paste was applied to a current collector core material 12 of a copper foil having a thickness of 10 μm and dried. Then, the current collector core material 12 with the negative electrode mixture paste applied thereon was rolled so as to have a total thickness of about 200 μm. Thereafter, a coating material obtained by adding a small amount of a binder material to an alumina material of which a particle diameter of about 1.2 μm is applied to a surface of a negative electrode active material layer 13 to a thickness of about 5 μm using roller type intermittent coating apparatus and then is dried. Thus, a porous protective film 28 is formed. Thereafter, the obtained material was cut by a splitter into strips each having a width of about 60 mm, which is a width of a negative electrode plate 3 of a cylindrical lithium secondary battery with a normal capacity of 2550 mAh, a diameter of 18 mm and a height of 65 mm, thereby forming a negative electrode plate hoop material 11.

Next, as each of groove processing rollers (i.e., a movable roller and a fixed roller) 22 and 23, a roller in which line projections each having an end angle θ of 120 degrees and a height H of 25 μm were formed with a pitch of 170 μm on a ceramic outer surface of a roll body having a roll diameter of 100 mm so as to be tilted at an angle of 45 degrees relative from a circumference direction of the roll body was used. The negative electrode plate hoop material 11 was passed through between the groove processing rollers 22 and 23 to form grooves 10 in both surfaces of each of both-surface coated parts 14 of the negative electrode plate hoop material 11. Gears 24 and 27 fixedly attached to respective roller axes of the rollers 22 and 23 were meshed with each other and the fixed roller 23 was driven to be rotated by a servomotor, so that the rollers 22 and 23 were rotated at the same rotating speed.

The movable roller 22 was pressurized by air cylinders. The depth D of the grooves 10 was adjusted by adjusting an air pressure of the air cylinders. In this case, the movable roller 22 was prevented by stoppers from moving to be close to the fixed roller 23 at a smaller distance than 100 µm that was the smallest space between the groove processing rollers 22 and 23 so as not to form the grooves 10 in the one-surface coated parts 17. The stoppers were adjusted so that the space between the groove processing rollers 22 and 23 is 100 µm.

A pressure to be applied to the movable roller 22 was adjusted so that the depth D of the grooves 10 becomes 8 µm, by adjusting an air pressure of each of the air cylinders to be 30 kgf for every 1 cm of the electrode plate width. Also, the negative electrode plate hoop material 11 was conveyed so as to be passed through a space between the groove processing rollers 22 and 23 at a speed of 5 m per minute. Then, when the depth D of the grooves 10 was measured by a contour measuring device, an average depth D was 8 µm. Moreover, using a laser microscope, whether or not cracks were generated in the negative electrode active material layers 13 was examined and cracks were not found. Note that increase in thickness of the negative electrode plate 3 was about 0.5 µm and expansion per cell in the longitudinal direction was about 0.1%.

(Formation of Positive Electrode Plate Hoop Material)

As a positive electrode active material, lithium nickel composite oxide represented by a composition formula of $LiNi_8Co_{0.1}Al_{0.05}O_2$ was used. Sulfuric acid containing Co and Al at a predetermined ratio was added to a $NiSO_4$ aqueous solution to prepare a saturated aqueous solution. Then, while the saturated aqueous solution was stirred, an alkali aqueous solution in which sodium hydroxide was dissolved was slowly dropped into the saturated aqueous solution to neutralize it and ternary nickel hydroxide $Ni_{0.8}Co_{0.15}Al_{0.05}(OH)_2$ was generated by precipitation. The precipitate was filtered, washed with water and dried at 80° C. An average gain size of nickel hydroxide obtained here was about 10 µm.

Then, lithium hydroxide hydrate was added to nickel hydroxide so that the ratio between the sum of number of atoms of Ni, Co and Al, and the number of atoms of Li was 1:1.03 and heat treatment was performed to nickel hydroxide in an oxygen atmosphere at a temperature of 800° C. for 10 hours, thereby obtaining desired $LiNi_{0.8}Co_{0.15}Al_{0.05}O_2$. It was confirmed by X-ray powder diffraction that obtained lithium nickel composite oxide had a single phase hexagonal crystal structure and Co and Al became a solid solution. Then, pulverization and classification were performed and positive electrode active material powder was obtained.

Five parts by weight of acetylene black as a conductive material was added to 100 parts by weight of an active material, and then a solution obtained by dissolving polyvinylidene fluoride (PVdF) as a binder in a solvent of N-methylpyrrolidone (NMP) was mixed with the mixture of the active material and acetylene black and was kneaded, so that a coating material in paste form was obtained. Note that the amount of PVdF was adjusted to be 5 parts by weight respect to 100 parts by weight of the active material. The paste was applied to both surfaces of a current collector core material of aluminum foil having a thickness of 15 µm and dried. Thereafter, the foil with the paste applied was rolled, thereby forming a positive electrode plate hoop material having a thickness of about 200 µm and a width of about 60 mm.

(Formation of Electrode Group)

Next, the electrode plate hoop materials were dried so that excess moisture was removed, and then the electrode plate hoop materials were wound with a separator 4 of polyethylene porous film having a thickness of about 30 µm interposed therebetween in a dry air room, thereby forming an electrode group 1. The negative electrode plate hoop material 11, which is one of the electrode plate hoop materials, was cut at each of the core material exposed parts 18 located between an associated one of the both-surface coated parts 14 and an associated one of the one-surface coated parts 17. Since the groove processing rollers 22 and 23 were set so that the grooves 10 were not formed in the negative electrode active material layer 13 in each of the one-surface coated parts 17, deformation into a curved shape did not occur in the core material exposed parts 18 and one-surface coated parts 17 after cutting the core material exposed parts 18, and reduction in operation of a winding device was not caused. Note that before winding, a current collector lead 20 was attached to the negative electrode plate hoop material 11 using a welding section of the winding device.

(Evaluation of Electrolyte Injection Property)

The electrode group 1 formed in the above-described manner was placed in a battery case 7. Thereafter, an electrolyte was injected therein and the electrolyte injection property was examined.

When evaluation of the electrolyte injection property was conducted, an injection method in which an electrolyte of about 5 g was supplied to the battery case and the air was vacuumed to impregnate the electrolyte was used. Note that the electrolyte may be supplied into the battery case by several injections.

After a predetermined amount of the electrolyte was injected, the battery case was placed in a vacuum booth and vacuuming was performed to exhaust the air in the electrode group. Subsequently, an atmosphere was introduced into the vacuum booth, so that the electrolyte was forced to permeate the electrode group due to a differential pressure between a pressure in the battery case and a pressure in the atmosphere. The vacuuming was performed under a vacuum of −85 kpa. An injection time for injection of the electrolyte in this process step was measured and used as injection time data for comparison of the electrolyte injection property.

As a result, the electrolyte injection time was about 22 minutes 17 seconds for the electrode group 1 using the negative electrode plate 3 in which the grooves 10 having a depth D of about 8 µm were formed in the porous protective film 28, and the electrolyte injection time was about 69 minutes 13 seconds for the electrode group 1 using a negative electrode plate in which the grooves 10 were not formed in the porous protective film 28. From this result, it has been confirmed that when the grooves 10 are formed, the electrolyte injection property can be drastically improved and the electrolyte injection time can be largely reduced.

(Safety Evaluation of Battery)

The electrode group 1 formed using the negative electrode plate 3 in which the grooves 10 were formed in the surface of the porous protective film 28 was placed in a battery case, and about 5 g of an electrolyte obtained by dissolving $LiPF_6$ of 1 M and 3 parts by weight of VC (vinylene carbonate) in a mixed solvent of EC (ethylene carbonate), DMC (dimethyl carbonate) and MEC (methylethyl carbonate) was injected therein. Thereafter, the battery case was sealed. Thus, a cylindrical battery with a nominal capacity of 2550 mAh, a nominal voltage of 3.7 V, a battery diameter of 18 mm, and a height of 65 mm was obtained.

A crash test, a nail sticking test and an external short circuit test were performed to obtained batteries to confirm that overheating and expansion did not occur. In an excessive charge test, it was confirmed that leakage opening, overheating and fume emission did not occur. Furthermore, in a heating test at 150° C., it was confirmed that expansion, overheating and fume emission did not occur. From the test results, it is clearly showed that even when groove processing is subjected to the porous protective film 28, the porous protective film 28 of an alumina material effectively functions and thus excessive heat does not occur.

INDUSTRIAL APPLICABILITY

An electrode plate for a battery according to the disclosure of the present invention is an electrode plate which exhibits good electrolyte impregnation and good productivity and reliability and in which the generation of an internal short circuit is suppressed. A lithium secondary battery including an electrode group configured using the electrode plate is useful for a driving power supply and the like for mobile electronic devices and communication devices.

The invention claimed is:

1. An electrode plate for a nonaqueous battery, in which an active material layer formed on a surface of a current collector core material is coated by a porous protective film, the electrode plate comprising:
   a both-surface coated part in which the active material layer and the porous protective film are formed on both surfaces of the current collector core material;
   a core material exposed part which is an end part of the current collector core material and in which the active material layer and the porous protective film are not formed; and
   a one-surface coated part which is provided between the both-surface coated part and the core material exposed part and in which the active material layer and the porous protective film are formed on only one of surfaces of the current collector core material,
   wherein a plurality of grooves are formed in both surfaces of the both-surface coated part and are not formed in the one-surface coated part, and
   the grooves are formed in a surface of the active material layer as well as a surface of the porous protective film so that each of the grooves extends from the porous protective film to the active material layer and the porous protective film has a smaller thickness than a depth of the grooves.

2. The electrode plate of claim 1, wherein the electrode plate is a negative electrode plate.

3. The electrode plate of claim 1, wherein the porous protective film is formed of a material containing inorganic oxide as a major component.

4. The electrode plate of claim 3, wherein the porous protective film is formed of a material containing alumina and/or silica as a major component.

5. The electrode plate of claim 1, wherein a depth of the grooves is within a range of 4 μm to 20 μm.

6. The electrode plate of claim 1, wherein the grooves are formed with a pitch of 100 μm to 200 μm along a longitudinal direction of the electrode plate.

7. The electrode plate of claim 1, wherein the grooves in the both surfaces of the both-surface coated part are formed so as to be tilted at an angle of 45 degrees from a longitudinal direction of the electrode plate so that a tilting direction of the grooves in one surface is different from a tilting direction of the grooves in the other surface and so as to intersect with one another at right angles in a grade separated crossing manner.

8. An electrode group for a nonaqueous battery, in which a positive electrode plate and a negative electrode plate are provided with a separator interposed therebetween,
   wherein at least one of the positive electrode plate and the negative electrode plate has the configuration of claim 1, and
   the electrode group is wound with the core material exposed part of the electrode plate as a winding start end or is stacked with the core material exposed part of the electrode plate as a stacking start end.

9. A lithium secondary battery, wherein the electrode group of claim 8 is placed in a battery case, a predetermined amount of a nonaqueous electrolyte is injected, and an opening portion of the battery case is closely sealed.

10. A method for producing the electrode plate of claim 1 for a nonaqueous battery, the method comprising the steps of:
   a) preparing an electrode plate hoop material including a both-surface coated part in which an active material layer and a porous protective film are provided on both surfaces of a current collector core material, a one-surface coated part in which the active material layer and the porous protective film are provided on only one of surfaces of the current collector core material and a core material exposed part in which the active material layer and the porous protective film are not provided, the both-surface coated part, the one-surface coated part and the core material exposed part being continuously formed in this order;
   b) rotating a pair of rollers each of which has a plurality of line projections formed on a surface thereof and which are arranged on and under the electrode plate hoop material with the pair of rollers pressed against both surfaces of the electrode plate hoop material so as to pass the electrode plate hoop material through a space between the pair of rollers, thereby simultaneously forming a plurality of grooves in both surfaces of the both-surface coated part;
   c) maintaining, after the both-surface coated part is passed through the space between the pair of rollers, the pair of rollers in a no pressure applied state for the one-surface coated part while the one-surface coated part is passed through the space between the pair of rollers; and
   d) cutting the negative electrode plate hoop material at the core material exposed part provided between the both-surface coated part and the one-surface coated part to divide the electrode plate hoop material into electrode plates for a nonaqueous battery,
   wherein in the step b), the grooves are formed in a surface of the active material layer as well as a surface of the porous protective film so that each of the grooves extends from the porous protective film to the active material layer and the porous protective film has a smaller thickness than a depth of the grooves.

11. The method of claim 10, wherein an end section of each of the line projections has a circular arc shaped cross-section and the line projections has a height larger than the depth of the grooves.

* * * * *